(12) United States Patent
Förster

(10) Patent No.: US 10,473,180 B2
(45) Date of Patent: Nov. 12, 2019

(54) FREQUENCY-DEPENDENT DAMPING VALVE ARRANGEMENT

(71) Applicant: ZF Friedrichshafen AG

(72) Inventor: Andreas Förster, Schweinfurt (DE)

(73) Assignee: ZF FRIEDRICHSHAFEN AG, Friedrichafen (DE)

(*) Notice: Subject to any disclaimer, the term of this patent is extended or adjusted under 35 U.S.C. 154(b) by 0 days.

(21) Appl. No.: 15/736,082

(22) PCT Filed: May 23, 2016

(86) PCT No.: PCT/EP2016/061522
§ 371 (c)(1),
(2) Date: Dec. 13, 2017

(87) PCT Pub. No.: WO2016/206880
PCT Pub. Date: Dec. 29, 2016

(65) Prior Publication Data
US 2018/0180134 A1    Jun. 28, 2018

(30) Foreign Application Priority Data

Jun. 26, 2015 (DE) .................. 10 2015 211 891

(51) Int. Cl.
*F16F 9/348* (2006.01)
*F16F 9/512* (2006.01)
*F16K 15/18* (2006.01)

(52) U.S. Cl.
CPC .......... *F16F 9/3488* (2013.01); *F16F 9/3485* (2013.01); *F16F 9/512* (2013.01);
(Continued)

(58) Field of Classification Search
CPC ........ F16F 9/3488; F16F 9/3485; F16F 9/512; F16F 9/5126; F16F 2228/066; F16F 2230/18; F16K 15/18
See application file for complete search history.

(56) References Cited

U.S. PATENT DOCUMENTS 4,953,671 A    9/1990  Imaizumi
5,018,608 A *  5/1991  Imaizumi .................. F16F 9/50
                                                   188/282.5
(Continued)

FOREIGN PATENT DOCUMENTS

DE        4441047       1/1996
DE      102014009004    2/2015
(Continued)

*Primary Examiner* — Thomas W Irvin
(74) *Attorney, Agent, or Firm* — Cozen O'Connor

(57) ABSTRACT

A damping valve arrangement (1) for a vibration damper includes a damping piston (2) with a check valve, which damping piston (2) divides a cylinder (31) of the vibration damper into a first working chamber (32) and a second working chamber (33), and a control arrangement (3) with a control pot (8) and a control piston (9) which is axially movable therein. A connection channel (41) connects the first working chamber (32) to the second working chamber (33). The connection channel (41) is arranged such that it is at least partially closed by the control piston (9) during an axial displacement of the control piston (9) in direction of the damping piston (2) and opened again during an axial displacement of the control piston (9) in direction of the pot base (30).

12 Claims, 3 Drawing Sheets

(52) U.S. Cl.
CPC ............ *F16F 9/5126* (2013.01); *F16K 15/18* (2013.01); *F16F 2228/066* (2013.01); *F16F 2230/18* (2013.01)

(56) References Cited

U.S. PATENT DOCUMENTS

| | | | | |
|---|---|---|---|---|
| 5,242,038 | A * | 9/1993 | Yamaoka | F16F 9/468 188/266.4 |
| 5,810,127 | A * | 9/1998 | Schmidt | F16F 9/464 188/282.2 |
| 5,823,305 | A | 10/1998 | Richardson | |
| 7,458,448 | B2 * | 12/2008 | Katou | F16F 9/3485 188/282.6 |
| 8,794,403 | B2 * | 8/2014 | Chikamatsu | F16F 9/512 188/280 |
| 8,794,405 | B2 * | 8/2014 | Yamashita | B60G 13/08 188/317 |
| 9,200,693 | B2 | 12/2015 | Lim | |
| 9,534,653 | B2 * | 1/2017 | Kim | F16F 9/3405 |
| 9,739,332 | B2 * | 8/2017 | Kim | F16F 9/5126 |
| 2004/0163906 | A1 * | 8/2004 | Gundermann | F16F 9/5126 188/316 |
| 2006/0283675 | A1 | 12/2006 | Teraoka | |
| 2009/0065315 | A1 * | 3/2009 | Chikamatsu | F16F 9/5126 188/313 |
| 2009/0078517 | A1 * | 3/2009 | Maneyama | F16F 9/512 188/314 |
| 2009/0084647 | A1 * | 4/2009 | Maneyama | F16F 9/34 188/314 |
| 2012/0181126 | A1 * | 7/2012 | de Kock | F16F 9/3488 188/282.8 |
| 2018/0187737 | A1 * | 7/2018 | Forster | F16F 9/3488 |
| 2018/0187738 | A1 * | 7/2018 | Forster | F16F 9/3488 |
| 2018/0313425 | A1 * | 11/2018 | Forster | F16F 9/5126 |
| 2019/0195307 | A1 * | 6/2019 | Forster | F16F 9/3485 |
| 2019/0195308 | A1 * | 6/2019 | Forster | F16F 9/3485 |

FOREIGN PATENT DOCUMENTS

| | | |
|---|---|---|
| DE | 102015205556 | 10/2015 |
| GB | 2222227 | 2/1990 |

* cited by examiner

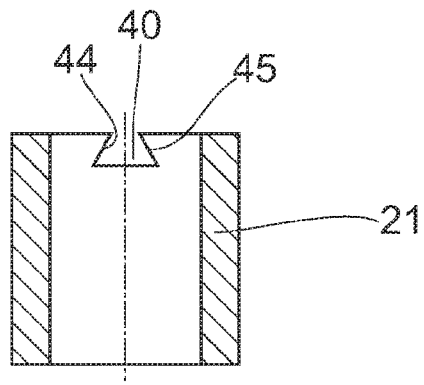
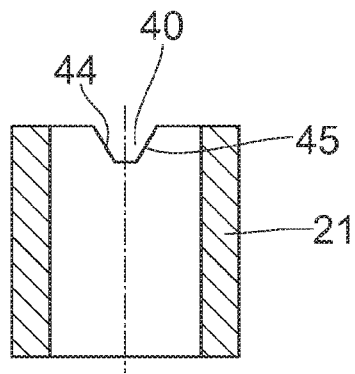
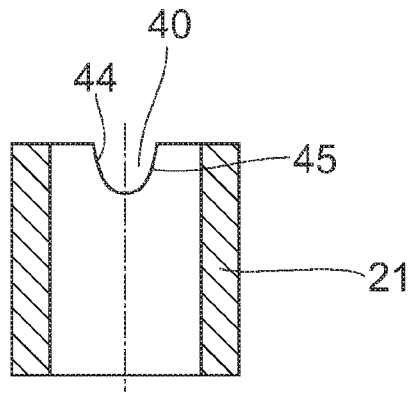

FREQUENCY-DEPENDENT DAMPING VALVE ARRANGEMENT

PRIORITY CLAIM

This is a U.S. national stage of application No. PCT/EP2016/061522, filed on May 23, 2016. Priority is claimed on the following application: Country: Germany, Application No.: 10 2015 211 891.6, filed: Jun. 26, 2015, the content of which is/are incorporated in its entirety herein by reference.

FIELD OF THE INVENTION

The present invention is directed to a damping valve arrangement with a frequency-dependent damping force characteristic.

BACKGROUND OF THE INVENTION

The object of a vibration damper in a motor vehicle is to damp vibrations excited by the uneven road surface. In this regard, there must always be a compromise between driving safety and driving comfort. A vibration damper with a stiff damping valve arrangement having a high damping force characteristic is optimal for high driving safety. If greater comfort is demanded, the damping valve arrangement should be adjusted to be as soft as possible. It is very difficult to find this compromise in a vibration damper with a conventional, non-electronic damping valve arrangement that is adjustable by an actuator.

Damping valve arrangements with a frequency-dependent damping force characteristic are known in the art. They are outfitted with an additional electronic and/or mechanical control and switch an additional damping valve arrangement on or off depending on a compression frequency and/or rebound frequency of the vibration damper.

DE 44 41 047 C1, U.S. 2006 28 36 75 A or U.S. Pat. No. 4,953,671 A may be cited by way of example.

There are also known solutions which have a control arrangement disposed at the piston rod coaxial to the damping piston comprising a control pot and a control piston which is axially displaceably arranged in the control pot. The control piston axially limits a control space which is enclosed in the control pot and which is connected to the damping valve arrangement via an inlet connection. A spring element is arranged between the control piston and the damping valve and introduces a spring force axially into the control piston on the one hand and into the damping valve on the other hand. When the control space is filled with damping medium, the control piston displaces in direction of the damping valve and, via the spring element, increases the pressing pressure of the valve disks of the damping valve, which increases the damping force.

However, all of the known damping valve arrangements are characterized by high complexity, among other reasons because they require highly precise adjustment. In particular, it is difficult in these vibration dampers to adjust the soft damping characteristic and the hard damping characteristic without additional control means.

SUMMARY OF THE INVENTION

Therefore, it is an object of the present invention to provide a simply constructed and economical damping valve arrangement which has a frequency-dependent damping force characteristic and allows the hard damping force characteristic to be influenced simply in a defined manner during operation.

According to the invention, the damping valve arrangement has a connection channel which connects the first working chamber to the second working chamber, this connection channel being arranged such that it is at least partially closed by the control piston during an axial displacement of the control piston in direction of the damping piston and opened again during an axial displacement of the control piston in direction of the pot base.

Accordingly, the amount of damping fluid flowing through into the control space is additionally controlled and the hard damping force characteristic is therefore influenced in a defined manner.

BRIEF DESCRIPTION OF THE DRAWINGS

The invention will be described more fully with reference to the following description of the figures in which:

FIG. 2 is a sectional view of an embodiment of a guide bush;

FIG. 3 is a sectional view of an alternative embodiment of a guide bush;

FIG. 4 is a sectional view of yet an alternative embodiment of a guide bush.

DETAILED DESCRIPTION OF THE PRESENTLY PREFERRED EMBODIMENTS

Figure 1:
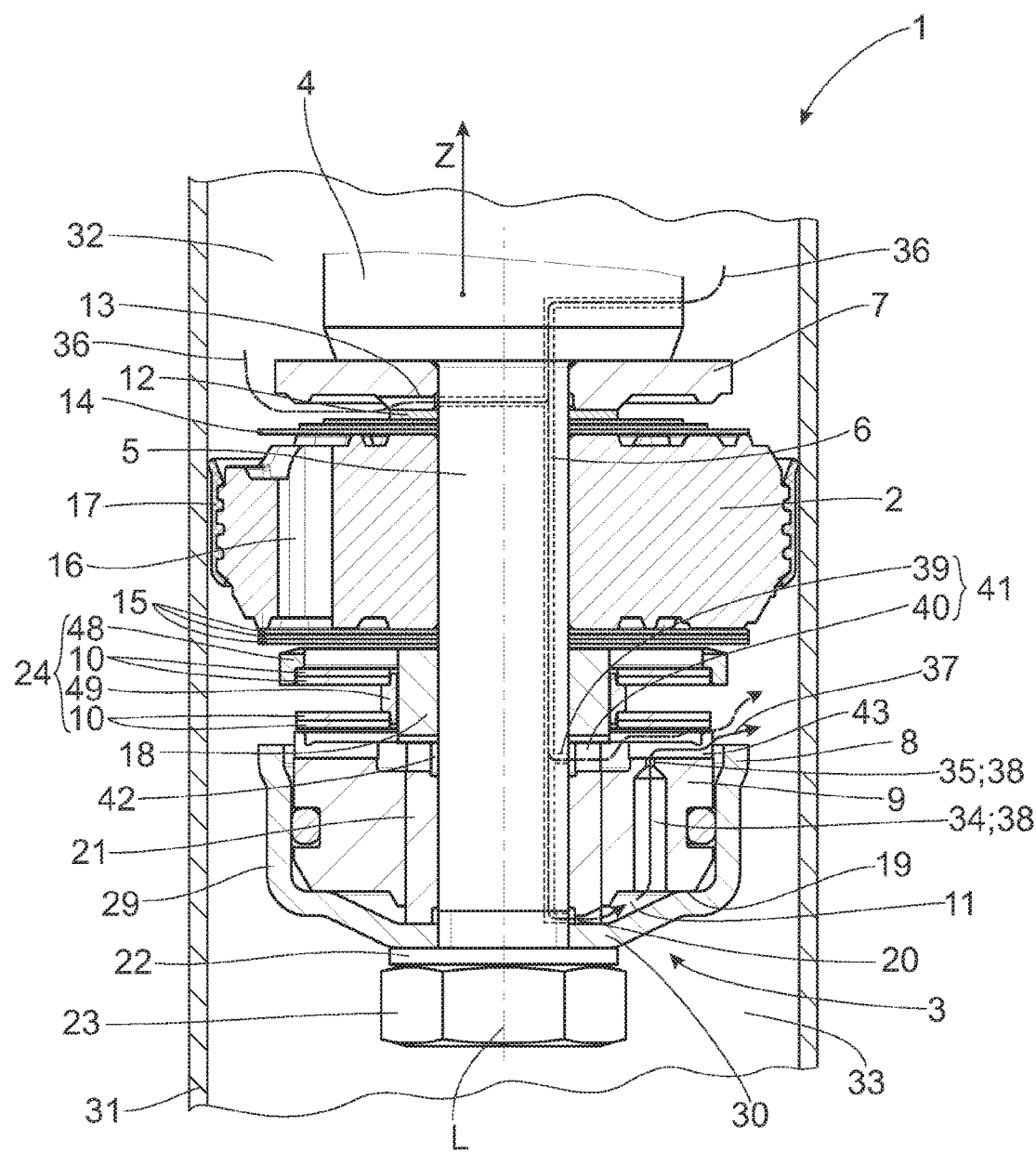
FIG. 1 is a sectional view of an embodiment of a damping valve arrangement according to the present invention.

FIG. 1 shows a piston rod 4 which has a piston rod tenon 5. The piston rod tenon 5 is a portion of the piston rod 4 that is reduced in diameter. The damping valve arrangement 1 in its entirety is threaded onto the piston rod tenon 5 and is axially clamped between a portion of the piston rod 4 which adjoins the piston rod tenon 5 and which has a larger diameter than the piston rod tenon 5 and a fastener 23 which is shown in FIG. 1 as a piston rod nut.

As is shown in FIG. 1, the damping valve arrangement 1 comprises a damping piston 2 which is arranged inside a cylinder 31 filled with a damping fluid and is axially fixed to a piston rod 4. The damping piston 2 is outfitted with a piston seal 17 which radially seals it relative to the cylinder 31. The damping piston 2 which is fixed to the piston rod 4 is arranged so as to be axially displaceable inside the cylinder 31 together with the piston rod 4 and divides the interior of the cylinder into a first working chamber 32 on the piston rod side and a second working chamber 33 remote of the piston rod 4.

The damping piston 2 is outfitted in each instance with a check valve in each flow direction of the damping fluid. The check valves comprise in each instance at least one flow channel 16 which is formed in the damping piston 2 and which is covered by at least one valve disk 15. As is shown in the drawings, the flow channels 16 can be covered by a plurality of valve disks 15 which are stacked one upon the other, known as valve disk packages. The quantity, size and shape of the individual valve disks 15 in a valve disk package define the pressing pressure, damping characteristic and damping behavior of a vibration damper.

A control arrangement 3 is arranged at the piston rod 4 coaxial to the damping piston 2, this control arrangement 3 comprising a thin-walled control pot 8 and a control piston 9 which is axially displaceable in the control pot 8. The control pot is shaped out of sheet metal. the control piston 9 can be made of a metal, a ceramic material or a suitable plastic, with or without fiber reinforcement, by cold forming, hot forming, casting, injection molding, turning or sintering. The control pot 8 has a cylindrical pot wall 29 and a disk-shaped pot base 30 which is arranged at an end of the control pot 8 remote of the damping piston 2.

On the side facing the check valve, the control piston 9 arranged in the control pot 8 axially limits a control space 11 enclosed in the control pot 8 so that an axial displacement of the control piston 9 within the control pot 8 changes the volume of the control space 11 in a defined manner.

Further, the damping valve arrangement 1 has an inlet connection 36 which connects the first working chamber 32 to the control space 11. In the constructional variant illustrated in FIG. 1, this inlet connection 36 comprises a bypass 6 formed at the piston rod 4 and at least one inlet choke 20 connecting the bypass 6 to the control space 11. Further, the inlet connection 36 can comprise at least one flow recess 13 connecting the bypass 6 to the first working chamber 32.

The damping valve arrangement 1 further has an outlet connection 37 which connects the control space 11 to the second working chamber 33. The outlet connection 37 connecting control space 11 and the second working chamber 33 includes outlet choke 38 which is comprised of first choke recess 34 having a relatively larger bore and a second choke recess 35 having a relatively smaller bore.

In the constructional variants shown in the drawings, a stop element 18 and a tubular guide bush 21 are arranged between the damping piston 2 and the pot base 30 of the control arrangement 3.

A spring arrangement 24 in the form of a plurality of spring disks 10 is arranged between the control piston 9 and the check valve. According to the constructional variant shown in FIG. 1, the spring arrangement 24 comprises four spring disks 10 combined in two spring disk pairs, and outer supporting component and an inner supporting component. In the spring arrangement 24 shown here, the position of the spring disk in the spring arrangement 24 is more important than the quantity of spring disks 10. As is shown in FIG. 1, the one spring disk pair facing the control piston 9 is axially supported by its outer edge area at the control piston 9. The second pair of spring disks is arranged coaxially at a distance therefrom, the inner edge area of the two spring disk pairs being axially supported at the inner supporting component. The second spring disk pair which faces the valve disk 15 is supported in its outer edge area by the outer supporting component which faces the valve disk 15 on the opposite side and abuts at the valve disk 15 in operational state.

Accordingly, the spring arrangement 24 loads the valve disk 15 axially in direction of the flow channel 16 and the control piston 9 in direction of the pot base 30 with a defined spring force.

The control piston 9 surrounds the guide bush 21 in circumferential direction and slides axially on the outer surface of the guide bush 21 during a change in the volume of the control space 11. A stop element 18 is clamped between the guide bush 21 and the damping piston 4 and has a greater outer diameter than the guide bush 21. The stop element 18 serves as an axial stop for the control piston 9 which limits the axial movement of the control piston 9 in direction of the damping piston 4 and influences the hard damping force characteristic. Beyond this, the stop element 18 takes over the function of a guide for the spring arrangement 24. The spring arrangement 24 surrounds the stop element 18 in circumferential direction.

Further, the damping valve arrangement has a connection channel 41 which opens into the bypass 6 and connects the first working chamber 32 to the second working chamber 33. It is provided in the constructional variant illustrated in FIG. 1 that a flow connection 39 is formed at the piston rod 4, a recess 40 is formed at the guide bush 21 and an opening 43 is formed at the control piston 9. The latter are arranged in such a way that they overlap one another at least partially, ultimately forming the connection channel 41.

It is noted here that the constructional variant shown in FIG. 1 should not be seen as the only one possible and should in no way limit the scope of protection.

The operation will be explained in more detail in the following.

During a movement of the piston rod 4 and of the damping valve arrangement 1 fastened thereto in pull direction Z, the damping fluid is conveyed via the inlet connection 36 from the working chamber 32 into the control space 11 and partially via connection channel 41 into the working chamber 33. The control piston 9 is displaced in direction of the damping piston 2 as a result of the control space 11 filling with damping fluid and, in so doing, further preloads the spring arrangement 24 which is axially supported at the valve disk 15 of the check valve. The damping force of the check valve is increased in this way.

The control piston 9 moving in direction of the damping piston 2 progressively closes the connection channel 41 so that the hard damping force characteristic increases in a defined manner.

During rapid, smaller axial movements of the damping piston 2 inside the cylinder 31, the control space 11 is filled only slightly or not at all so that the spring arrangement 24 is not preloaded further and the damping force remains at a defined low level. However, during larger, slower axial movements of the damping piston 2 inside the cylinder 31, the integral of the pressure differential of damping fluid pressure on the valve disk 15 to the damping fluid pressure in the control space 11 over time is large enough in spite of the choke resistance of the inlet connection 36 to supply the control space 11 with enough damping fluid so that the control piston 9 preloads the spring arrangement 24 until the control piston 9 strikes a stop element 18 arranged between the guide bush 21 and the valve disks 15 of the check valve. The stop element 18 limits the axial movement of the control piston 9 in direction of the damping piston 2 and accordingly limits the maximum preloading of the spring arrangement 24 and, therefore, also the highest damping force characteristic, since the connection channel 41 also has its smallest flow area here and has accordingly acquired the greatest flow resistance.

Both the level of the preloading acting on the valve disk 15 and the amount of damping fluid flowing through the connection channel 41 can be adjusted freely within certain limits independently from one another in the construction according to the invention. The preloading is defined by the stiffness of the spring arrangement 24 and the travel of the control piston 9. The amount of damping fluid flowing through the connection channel 41 via the tangential width and the quantity of connection channels 41. If the amount of damping fluid does not change linearly with the travel of the control piston 9, this may easily be implemented in that the tangential edge portions of the connection channels do not run parallel to one another as is shown, for example, in FIGS. 2, 3 and 4.

If the adjustment of the amount of damping fluid flowing through the connection channel 41 is to be dominant, the stiffness of the spring arrangement 24 is made very soft. In this case, for example, an additional spring, not shown in the drawings, can be used, which additional spring exerts a force on the control piston 9 that presses the latter into the initial position. This spring could be supported, for example, at least indirectly at the piston rod 4, e.g., at the stop element 18, rather than on the valve disk 15.

FIGS. 2, 3 and 4 show a recess 40 which is formed at the guide bush 21 and which has tangential edge portions 44; 45 running at least partially obliquely relative to one another. However, it can also be provided that the recess 40 formed at the guide bush 21 has tangential edge portions 44; 45 running at least partially parallel to one another so that a change in the flow rate of the damping fluid flowing through the connection channel 41 that is linear to the travel of the control piston 9 would be possible.

Figure 5:
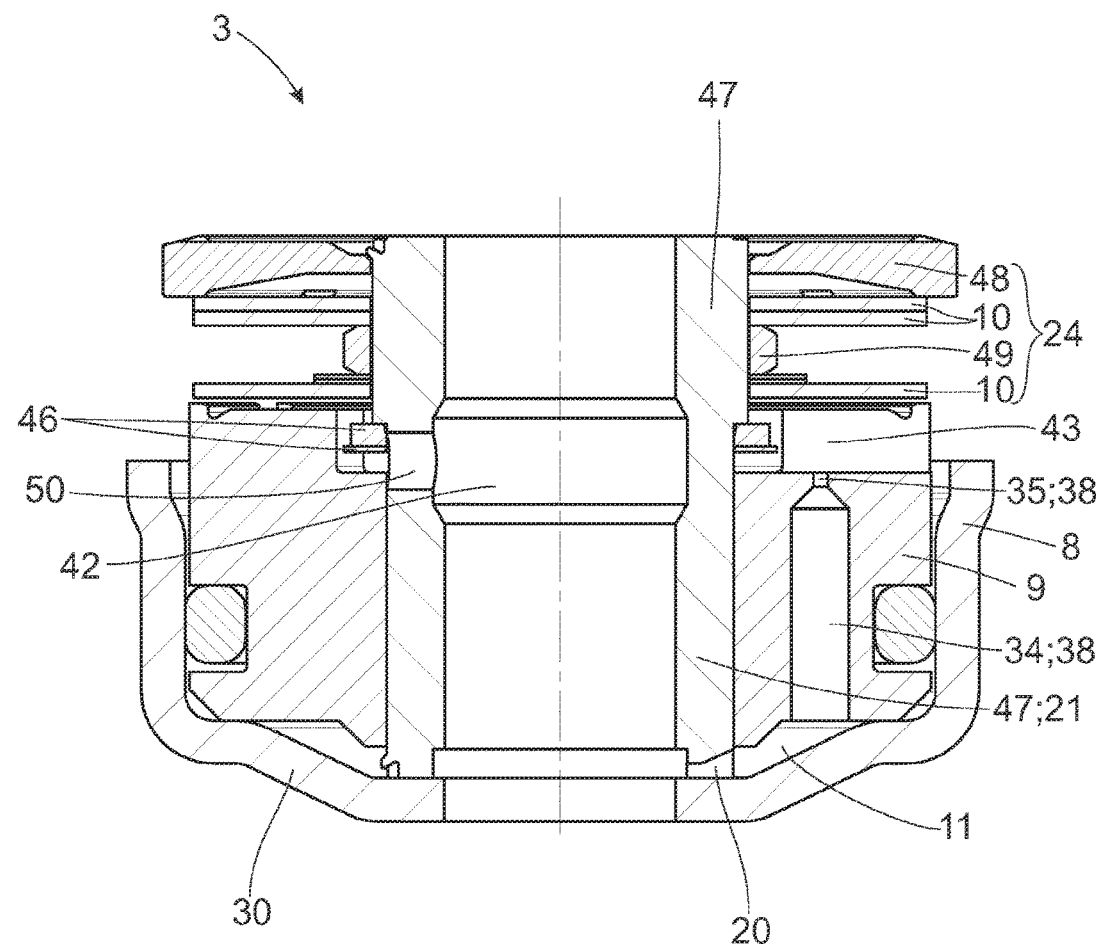
FIG. 5 is a sectional view of an alternative embodiment of a control arrangement according to the present invention.

In contrast to FIG. 1, the control arrangement 3 shown in FIG. 5 comprises a plurality of disk-shaped adjusting components 46 which also at least partially cover the connection channel 41.

Beyond this, the control arrangement 3 shown in FIG. 5 is implemented as a unit which can be assembled beforehand and which comprises a continuous inner sleeve 47 which penetrates all of the components of the control arrangement 3 and holds them together through a plastic deformation of the edge areas. Further, the sleeve 47 assumes the function of the guide bush 21 and stop element 18. The sleeve 47 comprises one or more transverse bores which are constructed to form the connection channel 41, correspond functionally to recesses 40 in FIG. 1 and, as was described above, are closed when the control piston 9 is displaced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve arrangement for a vibration damper, comprising:
   a piston rod;
   a cylinder at least partially filled with damping fluid;
   an axially displaceable damping piston arranged inside said cylinder and axially fixed to said piston rod, said damping piston comprising at least one flow channel formed in the damping piston and covered by at least one valve disk, said damping piston dividing said cylinder into a first working chamber on the piston rod side and a second working chamber remote of the piston rod;
   a control arrangement arranged at said piston rod coaxial to said damping piston and comprising a control pot having a cylindrical pot wall and a disk-shaped pot base arranged at an end of said control pot remote of said damping piston and devoid of any flow passage for the damping medium, said control arrangement further comprising an axially displaceable control piston arranged in said control pot and constructed to axially limit a control space enclosed in said control pot;
   said damping valve arrangement further comprising an inlet connection connecting said first working chamber to said control space, and wherein at least one spring arrangement is arranged between said control piston and said damping piston; said spring arrangement configured to load said valve disk axially in the direction of said flow channel and said control piston in the direction of said pot base with a defined spring force; and
   said damping valve arrangement further comprising a connection channel connecting said first working chamber to said second working chamber, said connection channel arranged so that the connection channel is at least partially closed by said control piston during an axial displacement of said control piston in the direction of said damping piston and opened during an axial displacement of said control piston in the direction of said pot base.

2. The damping valve arrangement according to claim 1, wherein said connection channel comprises a flow connection formed at said piston rod.

3. The damping valve arrangement according to claim 2, additionally comprising a tubular guide bush having an outer surface, said tubular guide bush arranged between said damping piston and said pot base of said control arrangement, wherein said control piston surrounds said guide bush in circumferential direction and slides axially on said outer surface of said guide bush, and said connection channel comprises a recess formed at said guide bush.

4. The damping valve arrangement according to claim 1, additionally comprising a tubular guide bush having an outer surface, said tubular guide bush arranged between said damping piston and said pot base of said control arrangement, wherein said control piston surrounds said guide bush in circumferential direction and slides axially on said outer surface of said guide bush, and said connection channel comprises a recess formed at said guide bush.

5. The damping valve arrangement according to claim 4, wherein said recess formed at said guide bush comprises tangential edge portions running at least partially parallel to one another.

6. The damping valve arrangement according to claim 4, wherein said recess formed at said guide bush comprises tangential edge portions running at least partially obliquely relative to one another.

7. The damping valve arrangement according to claim 1, wherein said connection channel comprises an opening formed at said control piston.

8. The damping valve arrangement according to claim 1, wherein said control arrangement comprises an adjusting component which at least partially and at least occasionally covers said connection channel.

9. The damping valve arrangement according to claim 1, wherein said control arrangement comprises a continuous inner sleeve which penetrates all of the components of said control arrangement and holds said components together through a plastic deformation of an edge area.

10. The damping valve arrangement according to claim 9, wherein said sleeve comprises at least one transverse bore constructed to form said connection channel and at least partially closed by said control piston during an axial displacement of said control piston in direction of said spring arrangement and opened again during an axial displacement of said control piston in direction of said pot base.

11. The damping valve arrangement according to claim 1, wherein said control piston comprises a flow channel connecting said control space with said second working chamber.

12. The damping valve arrangement according to claim 11, wherein said flow channel comprises an outlet choke which has a first choke recess having a relatively larger bore and a second choke recess having a relatively smaller bore.

* * * * *